United States Patent

Suzuki et al.

[11] Patent Number: 5,902,856
[45] Date of Patent: May 11, 1999

[54] RUBBER COMPOSITION OF TWO DIENE RUBBERS

[75] Inventors: Fumitoshi Suzuki, Yokohama; Masao Nakamura, Kawasaki; Manabu Tomisawa, Tokyo, all of Japan

[73] Assignee: Nippon Zeon Co., Ltd., Tokyo, Japan

[21] Appl. No.: 08/836,856

[22] PCT Filed: Nov. 24, 1995

[86] PCT No.: PCT/JP95/02395

§ 371 Date: May 22, 1997

§ 102(e) Date: May 22, 1997

[87] PCT Pub. No.: WO96/16118

PCT Pub. Date: May 30, 1996

[30] Foreign Application Priority Data

Nov. 24, 1994 [JP] Japan .................................. 6-314019

[51] Int. Cl.⁶ ............................................. C08L 9/00
[52] U.S. Cl. ........................... 525/237; 525/236; 525/274
[58] Field of Search ...................................... 525/237, 236

[56] References Cited

U.S. PATENT DOCUMENTS 5,017,636  5/1991  Hattori ..................................... 524/300
5,552,490  9/1996  Zanzig ..................................... 525/237

*Primary Examiner*—Christopher Henderson
*Attorney, Agent, or Firm*—Sherman and Shalloway

[57] ABSTRACT

A diene rubber (iii) can be obtained by mixing in a solution state:

a modified styrene-butadiene rubber (i) having a weight-average molecular weight of 150,000–500,000, obtained by reacting a diene polymer having a bound active metal in the molecule, with a modifier such as N-methyl-ε-caprolactam or the like, and a branched styrene-butadiene rubber (ii) having a weight-average molecular weight of 800,000 or more.

This diene rubber (iii) and a rubber composition comprising the diene rubber (iii) and other diene rubber (iv) have superior processability when unvulcanized and give a vulcanized rubber having improved abrasion resistance, resiliency and low-temperature properties.

13 Claims, No Drawings

RUBBER COMPOSITION OF TWO DIENE RUBBERS

TECHNICAL FIELD

The present invention relates to a diene rubber having superior processability when unvulcanized and giving a vulcanized rubber improved in abrasion resistance, resiliency and low-temperature properties; as well as to a rubber composition comprising such a diene rubber.

BACKGROUND ART

In recent years, the lower fuel consumption requirement for automobiles became stricter from the standpoints of energy saving, environmental protection, etc. In this connection, a rubber material for tires, of small rolling friction and superior abrasion resistance is required strongly.

It is known that in diene rubbers such as polybutadiene (BR), styrene-butadiene copolymer rubber (SBR) and the like, their abrasion resistance and resilience can be improved by making larger the molecular weight. Diene rubbers of larger molecular weight are improved in these properties; however, they have drawbacks such as lower processability when unvulcanized, increased hardness at low temperatures and the like, making difficult their practical use in many cases. Hence, there were proposed methods of adding, as a processability improver, a liquid BR, a liquid SBR or the like all having a molecular weight of 50,000 or less (e.g. JP-A-4-277537, JP-A-6-65418 and JP-A-6-65419). With these methods, however, addition of a large amount of a liquid rubber reduces the superior abrasion resistance and resilience inherently possessed by high-molecular polymers, and the other drawback of high-molecular polymers, i.e. the low-temperature hardness is not improved noticeably.

Meanwhile, JP-A-61-271338 disclosed a rubber composition comprising a branched polymer and a modified polymer, obtained by subjecting a diene polymer containing active lithium in the molecule, obtained by anionic polymerization using n-butyllithium, to tin coupling of required level and then modifying the remaining active lithium with a particular cyclic urea compound. In this rubber composition, however, the branched polymer has a low weight-average molecular weight not higher than 600,000; therefore, the rubber composition is insufficient in resiliency, abrasion resistance, etc. and, moreover, is not fully satisfactory in processability, low-temperature hardness, etc.

DISCLOSURE OF THE INVENTION

In view of the above situation, the present inventors made a study. As a result, the present inventors found out that a diene rubber obtained by mixing a modified polymer having a particular molecular weight, obtained using a particular modifier such as N-methyl-ε-caprolactam or the like, with a diene high-molecular polymer having a weight-average molecular weight of 800,000 or more has superior processability when unvulcanized and gives a vulcanized rubber of improved resiliency, abrasion resistance and low-temperature properties; that the diene rubber can be highly balanced in abrasion resistance, resiliency, processability and low-temperature hardness by making large the ratio of the molecular weight of the high-molecular polymer to the molecular weight of the modified polymer; that the diene rubber superior in the above-mentioned properties can be easily obtained by mixing the modified polymer and the high-molecular polymer in a solution state; and that a rubber composition obtained by adding a small amount of the diene rubber to other diene rubber such as natural rubber or the like gives a vulcanized rubber sufficiently improved in properties such as resiliency, abrasion resistance, low-temperature hardness and the like.

According to the present invention, there is provided a diene rubber (iii) comprising:
   a modified diene rubber (i) having a weight-average molecular weight of 150,000–500,000, obtained by reacting a diene polymer having a bound active metal in the molecule, with a modifier having a functional group represented by the general formula —C(=M)— (wherein M is an oxygen atom or a sulfur atom), and
   a high-molecular diene rubber (ii) having a weight-average molecular weight of 800,000 or more.

According to the present invention, there is further provided a process for producing a diene rubber (iii), which comprises mixing:
   a modified diene rubber (i) having a weight-average molecular weight of 150,000–500,000, obtained by subjecting a conjugated diene or a conjugated diene and an aromatic vinyl to anionic polymerization in a hydrocarbon solvent in the presence of an active metal-containing initiator and then reacting the resulting polymer with a modifier having a functional group represented by the general formula —C(=M)— (wherein M is an oxygen atom or a sulfur atom), and
   a high-molecular diene rubber (ii) having a weight-average molecular weight of 800,000 or more in a solution state and then subjecting the resulting mixture to solvent removal.

According to the present invention, there is furthermore provided a rubber composition comprising, as the rubber component, at least 10% by weight of the above diene rubber (iii).

Modified diene rubber (i)

The modified diene rubber (i) is a homopolymer or a copolymer, both composed mainly of a conjugated diene, and contains a conjugated diene generally in an amount of 40% by weight or more. The conjugated diene includes, for example, 1,3-butadiene, 2-methyl-1,3-butadiene, 2,3-dimethyl-1,3-butadiene, 2-chloro-1,3-butadiene, 1,3-pentadiene, etc. Preferred are 1,3-butadiene, 2-methyl-1,3-butadiene, etc., and more preferred is 1,3-butadiene. These conjugated dienes can be used singly or in combination of two or more of them.

The comonomer copolymerized with the conjugated diene is not particularly restricted as long as it does not impair the properties required for the modified diene rubber (i), but an aromatic vinyl is used generally. As the aromatic vinyl, there can be mentioned, for example, styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, N,N-dimethylaminomethylstyrene, N,N-dimethylaminomethylstyrene, vinylnaphthalene, etc. Styrene is particularly preferred. These comonomers can be used singly or in combination of two or more of them.

The proportion of the conjugated diene units in the modified diene rubber is generally 40% by weight or more. For example, in the conjugated diene-aromatic vinyl copolymer, the content of the conjugated diene units is generally 40–95% by weight, preferably 50–90% by weight, more preferably 60–85% by weight; and the content of the aromatic vinyl units is generally 60–5% by weight, preferably 50–10% by weight, more preferably 40–15% by weight. When the amount of the bound aromatic vinyl is too large, the resulting copolymer is hard, reducing a balance of wet skid resistance and resiliency, which is not good.

The molecular weight of the modified diene rubber is expressed as a standard polystyrene-reduced weight-average molecular weight as measured by GPC. Its lower limit is 150,000, preferably 180,000, more preferably 200,000; and its upper limit is 500,000, preferably 400,000, more preferably 350,000. When the weight-average molecular weight is too small, there occurs reduction in resiliency, abrasion resistance, dependency of hardness on temperature, etc.; when the weight-average molecular weight is too large, there occurs extreme reduction in processability; therefore, none of these molecular weights is good.

The modified diene rubber can be produced by reacting a diene polymer having a bound active metal in the molecule, with a modifier having a functional group represented by the general formula —C(=M)— (wherein M is an oxygen atom or a sulfur atom).

As to the active metal, there is no particular restriction but an active metal capable of giving rise to anionic polymerization is used generally. The active metal capable of giving rise to anionic polymerization includes, for example, alkali metals such as lithium, sodium, potassium, rubidium, cesium and the like; alkaline earth metals such as beryllium, magnesium, calcium, strontium, barium and the like; lanthanide series rare earth metals such as lanthanum, neodymium and the like; and so forth (these metals are described in JP-A-58-162604, JP-A-61-42552, JP-B-5-30841, JP-A-63-297403, etc.). Preferred are alkali metals, alkaline earth metals, etc. and more preferred are alkali metals.

The diene polymer having a bound active metal can be produced by an ordinary process. The diene polymer includes, for example, a polymer having an active metal at the polymer chain terminals, produced by subjecting the monomer(s) to anionic polymerization using an active metal-containing initiator in a hydrocarbon solvent, according to the process described in JP-A-58-162604; a polymer having an active metal in the polymer chain, produced by subjecting a polymer obtained by emulsion polymerization, anionic polymerization or the like, to a post reaction of adding an active metal; and so forth. The diene polymer is not restricted to these. A polymer having an active metal at polymer the chain terminals is preferred.

As the active metal-containing initiator, there can be used an organic alkali metal catalyst, an organic alkaline earth metal catalyst, a lanthanide series rare earth metal salt of an organic acid, or the like. The organic alkali metal catalyst includes, for example, organic monolithium compounds such as n-butyllithium, sec-butyllithium, t-butyllithium, hexyllithium, phenyllithium, stilbenelithium, N,N-dimethylaminolithium, N,N-diethylaminolithium and the like; polyfunctional organic lithium compounds such as dilithiomethane, 1,4-dilithiobutane, 1,4-dilithio-2-ethylcyclohexane, 1,3,5-trilithiobenzene and the like; organic sodium compounds such as sodium naphthalene and the like; organic potassium compounds such as potassium naphthalene and the like; and so forth. An organic lithium compound is preferable, and an organic monolithium compound is more preferable. The organic alkaline earth metal catalyst includes, for example, n-butylmagnesium, n-hexylmagnesium, ethoxycalcium, calcium stearate, t-butoxystrontium, ethoxybarium, isoproxybarium, ethylmercaptobarium, t-butoxybarium, phenoxybarium, diethylaminobarium, barium stearate, ethylbarium, etc. The lantanide series rare earth metal salt of an organic acid includes, for example, composite catalysts described in JP-B-63-64444, such as neodymium salt of Versatic Acid/triethylaluminum/ethylaluminum sesquichloride and the like.

These initiators may be used singly or in combination. The amount of the initiator used is appropriately determined depending upon the kind of the initiator or the required molecular weight of the polymer formed. For example, in producing a polymer having a molecular weight of 150,000–500,000, preferably 180,000–400,000, more preferably 200,000–350,000 using n-butyllithium as the initiator, the initiator is used in an amount of generally 0.65–0.3 mM, preferably 0.60–0.35 mM, more preferably 0.55–0.4 mM per 100 g of the total monomers.

The anionic polymerization using the above initiator is conducted in a hydrocarbon solvent which causes no destruction of the initiator. The hydrocarbon solvent suitable for use in the polymerization can be any as long as it can be used in ordinary anionic polymerization. It is selected from, for example, aliphatic hydrocarbons such as n-butane, n-pentane, isopentane, n-hexane, n-heptane, isooctane and the like; alicyclic hydrocarbons such as cyclopentane, cyclohexane, methylcyclopentane and the like; aromatic hydrocarbons such as benzene, toluene and the like; and so forth. n-Hexane, cyclohexane, benzene, etc. are preferred. An unsaturated hydrocarbon of low polymerizability such as 1-butene, cis-2-butene, 2-hexene or the like may be used as well. These hydrocarbon solvents are used singly or in admixture of two or more of them. The amount of the hydrocarbon solvent used is generally such that the monomer(s) concentration becomes 1–30% by weight.

In the polymerization reaction, it is possible to add a polar compound in order to control the microstructure of bound conjugated diene units or the distribution of aromatic vinyl (copolymerized with conjugated diene) in the copolymer chain. The polar solvent includes ethers such as tetrahydrofuran, diethyl ether, dioxane, ethylene glycol dimethyl ether, ethylene glycol dibutyl ether, diethylene glycol dimethyl ether, diethylene glycol dibutyl ether and the like; tertiary amine compounds such as tetramethylethylenediamine, trimethylamine, triethylamine, pyridine, quinuclidine and the like; alkali metal alkoxide compounds such as potassium t-amyloxide, potassium t-butyloxide and the like; phosphine compounds such as triphenylphosphine and the like; and so forth.

These polar compounds can be used singly or in combination of two or more of them. The amount of the polar compound used is generally 0–200 moles per mole of the initiator.

The polymerization reaction is conducted generally in a temperature range of 20–150° C. in a mode such as batchwise mode, continuous mode or the like. When an aromatic vinyl is copolymerized, it is desirable for improved randomness of aromatic vinyl to continuously or intermittently feed a conjugated diene or a mixture of a conjugated diene and an aromatic vinyl to allow the proportion of aromatic vinyl to the total amount of aromatic vinyl and conjugated diene in polymerization system to fall in a particular range, as described in, for example, JP-A-59-140211 and JP-A-56-143209. Examples of the polymer obtained can be a polybutadiene, a polyisoprene, a butadiene-isoprene copolymer, a styrene-butadiene copolymer, a styrene-isoprene copolymer, a styrene-butadiene-isoprene copolymer, etc. Thus, a conjugated diene polymer having a bound active metal at the polymer chain terminals (hereinafter referred to as "active polymer") can be obtained.

As the modifier, there is used a compound having, in the molecule, at least one functional group represented by the general formula —C(=M)— (M is an oxygen atom or a sulfur atom). A particularly preferred compound is a compound having at least one —C(=M)— group and at least one subsbstituted amino group. In the compound, the —C(=M)— group and the substituted amino group may be adjacent or apart. The compound wherein the —C(=M)— group and the substituted amino group are adjacent, includes, for example, amides, imides, ureas, isocyanuric acids, etc. all having a —C(=M)—N< bond; thio compounds corresponding thereto; and so forth. Of these, preferred are cyclic compounds and more preferred are N-substituted cyclic amides and N-substituted cyclic ureas. The compound wherein the —C(=M)— group and the substituted amino group are apart, includes, for example, N-substituted aminoketones, N-substituted aminoaldehydes, etc.; thio compounds corresponding thereto;

and so forth. Of these, preferred are N-substituted aminoketones, N-substituted aminoaldehydes, etc. and more preferred are N-substituted aminoketones.

Specific examples of the modifier include, for example, N-methyl-β-propiolactam, N-phenyl-β-propiolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-ω-caprolactam, N-methyl-ω-laurylolactam, N-vinyl-ω-laurylolactam, 1,3-dimethylethyleneurea, 1,3-divinylethyleneurea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis(diphenylamino)-2-propanone, 1,7-bis(methylethylamino)-4-heptanone, 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, 4-N,N-dimethylaminobenzaldehyde, 4-N,N-diphenylaminobenzaldehyde, 4-N,N-divinylaminobenzaldehyde, etc. Of these, particularly preferred are 4,4'-bis(dimethylamino)benzophenone, 4,4'-bis(diethylamino)-benzophenone, 4,4'-bis(diphenylamino)benzophenone, N-methyl-ε-caprolactam, N-methyl-2-pyrrolidone, N-vinyl-2-pyrrolidone, N-phenyl-2-pyrrolidone, N-vinyl-2-piperidone, etc.

These modifiers can be used singly or in combination of two or more of them. The amount of the modifier used is appropriately determined depending upon the kind of the modifier or the properties required for the modified diene rubber obtained, but is generally 0.5 equivalent or more, preferably 0.8–50 equivalents, more preferably 1–10 equivalents per the initiator used. When the amount of the modifier used is too small, there occurs extreme reduction in resiliency, which is not good. When all of the active metals are not modified with the modifier, the whole or part of the remaining (unmodified) active metals may be subjected to coupling using a coupling agent described later.

The modification reaction is conducted by an ordinarily known method using the above-mentioned modifier. The amount of the modifier used is as mentioned above. The reaction temperature and time can each be selected in a wide range, but is generally room temperature to 120° C. and several seconds to several hours. The reaction is conducted by contacting the active polymer with the modifier and generally by adding a necessary amount of the modifier to a solution of an active polymer before termination of polymerization.

High-molecular diene rubber (ii)

The high-molecular diene rubber (ii) is a homopolymer or a copolymer, both composed mainly of a conjugated diene, and can be produced by an ordinary process. The conjugated diene includes, for example, 1,3-butadiene, 2-methyl-1,3-butadiene, 2,3-dimethyl-1,3-butadiene, 2-chloro-1,3-butadiene, 1,3-pentadiene, etc. Preferred are 1,3-butadiene, 2-methyl-1,3-butadiene, etc., and more preferred is 1,3-butadiene. These conjugated dienes can be used singly or in combination of two or more of them.

The comonomer copolymerized with the conjugated diene is not particularly restricted as long as it does not impair the properties required for the high-polymer diene rubber (ii), but an aromatic vinyl is used generally. As the aromatic vinyl, there can be mentioned, for example, styrene, α-methylstyrene, 2-methylstyrene, 3-methylstyrene, 4-methylstyrene, 2,4-diisopropyistyrene, 2,4-dimethylstyrene, 4-t-butylstyrene, 5-t-butyl-2-methylstyrene, vinylnaphthalene, etc. Styrene is particularly preferred. These aromatic vinyls can be used singly or in combination of two or more of them.

The proportion of the conjugated diene units in the high-molecular diene rubber is generally 40% by weight or more. In order to obtain a high balance of resiliency and grip property (e.g. wet skid resistance), it is desirable to allow the high-molecular diene rubber to contain an aromatic vinyl. In the conjugated dienearomatic vinyl copolymer, the content of the conjugated diene units is generally 40–95% by weight, preferably 50–90% by weight, more preferably 60–85% by weight; and the content of the aromatic vinyl units is generally 60–5% by weight, preferably 50–10% by weight, more preferably 40–15% by weight.

The molecular weight of the high-molecular diene rubber is 800,000 or more, preferably 900,000–2,000,000, more preferably 1,000,000–1,500,000 in terms of a polystyrene-reduced weight-average molecular weight as measured by GPC. When the weight-average molecular weight of the high-molecular diene rubber is too small, there occurs reduction in resiliency, abrasion resistance, etc., which is not good.

The high-molecular diene rubber may be a straight-chain type or a branched type, but is preferably a branched type in view of the improved processability (e.g. improved extrudability). Such a preferable branched high-molecular diene rubber can be produced by producing an active polymer in the same manner as in the above-mentioned production of the modified diene rubber, and then reacting the active polymer with a polyfunctional coupling agent, according to the process described in, for example, JP-A-6-65419 or the like.

As the polyfunctional coupling agent, there can be used those used in ordinary coupling reaction of anionic polymer. Representative examples thereof are compounds represented by the general formulas $R_pMX_{4-p}$, $M'X_2$, $X_3M—R'—MX_3$, $X_2RM—R'—MRX_2$, etc. In the above formulas, M is Si, Ge, Sn or Pb; M' is Sn or Pb; X is chlorine, bromine or iodine; R is an alkyl group, an alkoxy group, an allyl group or an aryl group; R' is an alkylene group or a phenylene group; and p is an integer of 0–4. Specific examples are tin tetrachloride, tin dichloride, tin tetrabromide, silicon tetrachloride, silicon tetrabromide, silicon tetraiodide, germanium tetrachloride, lead dichloride, methyltrichlorosilane, dimethyldichlorosilane, butyltrichlorosilane, dibutyldichlorotin, bistrichlorosilylethane, bistrichlorostannylethane, tetramethoxysilicon, tetramethoxytin, tetraethoxysilicon, tetraethoxytin, tetrabutoxysilicon, tetrabutoxytin, etc.

The coupling agents other than represented by the above formulas include carboxylic acid esters such as dimethyl adipate, diethyl adipate, ethyl benzoate, dimethyl terephthalate, diethyl terephthalate, dimethyl phthalate, dimethyl isophthalate and the like; carboxylic acid halides such as terephthalic acid dichloride, phthalic acid dichloride, isophthalic acid dichloride, adipic acid dichloride and the like; carbon tetrachloride; and so forth. Of these coupling agents, preferred are tin compounds, silicon compounds, etc. and particularly preferred are tin tetrachloride, silicon tetrachloride, tetramethoxysilicon, tetramethoxytin, tetrabutoxytin, etc.

These coupling agents are used singly or in combination of two or more of them. The amount of the coupling agent used varies depending upon the molecular weight required for the high-molecular diene rubber obtained, the proportion of the branched polymer formed, the reactivity of the coupling agent, etc., but is usually 0.01–10 moles per mole of the active polymer. The proportion of the branched polymer formed is not particularly restricted but is generally 10–100% by weight, preferably 20–80% by weight, more preferably 30–60% by weight. In this case, the amount of the polyfunctional coupling agent used, when the agent is a tetrafunctional metal halide, is generally 0.02 equivalent or more, preferably 0.045–0.25 equivalent, more preferably 0.07–0.2 equivalent per mole of the active metal used.

The coupling reaction is conducted generally at 0–150° C. for 0.5–20 hours. It is preferable in view of the effects of the present invention that after the coupling reaction, part or the whole of the remaining active polymer is reacted with at least one of the above-mentioned modifiers. In view of, in particular, the balance of the effects of the present invention, the proportion of the polymer subjected to coupling, in the high-molecular diene rubber is 90–10% by weight, preferably 80–20% by weight, more preferably 60–30% by weight; and the proportion of the modified polymer is 10–90% by weight, preferably 20–80% by weight, more preferably 40–70% by weight.

Diene rubber (iii)

The diene rubber (iii) of the present invention can be produced by mixing the modified diene rubber (i) and the high-molecular diene rubber (ii) in a solid state or in a solution state. The modified diene rubber (i) can be used as a single rubber or in combination of two or more kinds of rubbers. The high-molecular diene rubber (ii) can be used as a single rubber or in combination of two or more kinds of rubbers.

The mixing in a solid state can be conducted by mixing two polymers (obtained by separation from respective solutions and subsequent drying) using a mixer such as Banbury mixer, roll or the like. The mixing in a solution state can be conducted by producing a modified diene rubber (i) and a high-molecular diene rubber (ii) each in a solution state, transferring the respective solutions into a given vessel (a tank or the like) at a given ratio of (i) and (ii), and mixing the solutions preferably with stirring by the use of a stirrer. After the mixing of the polymer solutions, polymer separation and drying are conducted by ordinary methods, whereby a polymer mixture can be obtained. In the present invention, it is preferable to employ the mixing in a solution state because the component (i) tends to cause flow. It is also possible that the diene rubber (iii) of the present invention obtained in a solution state is mixed with a process oil, carbon black, silica, etc. and the mixture is subjected to solvent removal to obtain, for example, a master batch containing an extender oil, carbon black, silica, etc.

The proportions of the modified diene rubber (i) and the high-molecular diene rubber (ii) in the diene rubber (iii) can be appropriately determined depending upon the properties required for the diene rubber (iii). However, the proportion of the component (i) is generally 5–80% by weight, preferably 10–50% by weight, more preferably 10–30% by weight; and the proportion of the component (ii) is generally 95–20% by weight, preferably 90–50% by weight, more preferably 90–70% by weight. When the proportion of the modified diene rubber is too small, low processability is invited; conversely, when the proportions is too large, low abrasion resistance and processability are invited; therefore, any of these cases is not good.

In the diene rubber (iii), the properties such as resiliency, abrasion resistance, processability, dependency of hardness on temperature, and the like are balanced well when the ratio of the weight-average molecular weight ($M_1$) of the modified diene rubber component and the weight-average molecular weight ($M_2$) of the high-molecular diene rubber component has a relation of $M_2/M_1>3.2$, preferably $M_2/M_1>3.5$, more preferably $7.5>M_2/M_1>3.8$. A diene rubber having such a $M_2/M_1$ ratio can be produced, when, for example, there is used, as the high-molecular diene rubber component, the above-mentioned polymer subjected to coupling, by using, as the active polymer to be subjected to coupling, an active polymer having a weight-average molecular weight larger than that of the active polymer to be modified.

The properties of the diene rubber (iii) can be varied by varying the microstructure of the conjugated diene units in the diene rubber. For example, increase in vinyl bond (1,2-vinyl bond and 3,4-vinyl bond) of conjugated diene units results in improvement in polymer properties such as grip property (wet skid resistance), resiliency, reversion of vulcanization and the like; meanwhile, reduction in vinyl bond results in further improvement in abrasion resistance, resiliency, etc. Therefore, the microstructure of conjugated diene nits is appropriately selected depending upon the application purpose of the diene rubber; for example, when further improvement in resiliency and abrasion resistance is desired, it is preferable to select the vinyl bond content in a range of 10–30% and, when improvement in wet skid resistance is desired, it is preferable to select the vinyl bond content in a range of 30–90%.

There is no particular restriction as to the distribution of the vinyl bond of conjugated diene units in the polymer chain. The vinyl bond may be uniformly distributed in the polymer, or may be distributed so as to gradually decrease along the polymer chain, or may be distributed in blocks. The distribution is appropriately selected depending upon the application purpose of the diene rubber.

The diene rubber (iii) may not contain any aromatic vinyl compound; however, when the rubber contains an aromatic vinyl, the content of the aromatic vinyl units is generally 5–60% by weight, preferably 10–50% by weight, more preferably 15–40% by weight. The diene rubber (iii), when containing aromatic vinyl units in the above range, has good grip property (e.g. good wet skid resistance).

When the diene rubber (iii) contains aromatic vinyl units, it is appropriate in view of the resiliency, abrasion resistance, wet skid resistance, etc. of the diene rubber that the content of the isolated aromatic vinyl chain consisting of one aromatic vinyl unit is 40% by weight or more, preferably 50% by weight or more, more preferably 55% by weight or more of the total bound aromatic vinyl amount and that the content of the aromatic vinyl long chain consisting of eight or more aromatic vinyl units is 5% by weight or less, preferably 2.5% by weight or less, more preferably 1.5% by weight or less of the total bound aromatic vinyl amount.

The Mooney viscosity ($ML_{1+4}$, 100° C.) of the diene rubber (iii) is not particularly restricted but, in view of the mechanical strengths, processability, etc. is generally 20–150, preferably 30–120, more preferably 50–100.

When the Mooney viscosity of the diene rubber is too low, improvement in resiliency and abrasion resistance is not sufficient; when the viscosity is too high, the resulting diene rubber has problems in processability, extrudability, etc. when made into a compound. When the diene rubber (iii) of the present invention is used in an oil-extended state, the Mooney viscosity is higher than 150 in some cases.

Rubber composition

The rubber composition of the present invention is a mixture of the diene rubber (iii) as rubber component with rubber compounding materials ordinarily used in the rubber industry. The rubber component can be the diene rubber (iii) per se, or a combination of the diene rubber (iii) and other diene rubber (iv). In the latter case, the content of the diene rubber (iii) in the rubber component should be at least 10% by weight. When the proportion of the diene rubber (iii) in the rubber component is too small, the effects of the present invention are not fully exhibited.

As the other diene rubber (iv), there can be mentioned, for example, natural rubber (NR), polyisoprene rubber (IR), styrene-butadiene copolymer rubber (SBR) produced by emulsion polymerization, random SBR (bound styrene= 5–50% by weight, 1,2-vinyl content of butadiene units= 10–80%) produced by solution polymerization, high-trans SBR (1,4-trans content of butadiene units=70–95%), low-cis polybutadiene rubber (BR), high-cis BR, high-trans BR (1,4-trans content of butadiene units=70–95%), styrene-isoprene copolymer rubber (SIR), butadiene-isoprene copolymer rubber, random styrene-butadiene-isoprene copolymer rubber (SIBR) produced by solution polymerization, SIBR produced by emulsion polymerization, styrene-acrylonitrile-butadiene copolymer rubber produced by emulsion polymerization, acrylonitrile-butadiene copolymer rubber, block copolymers (e.g. high-vinyl SBR-low-vinyl SBR block copolymer rubber, polystyrene-polybutadiene-polystyrene block copolymer), etc. These rubbers can be appropriately selected so as to satisfy the properties required for the rubber composition. Of these, preferred are NR, BR, IR, SBR, etc. with NR, IR, etc. being particularly preferred in view of the processability.

When the diene rubber (iii) and the other diene rubber (iv) are used in combination as the rubber component of the rubber composition, the ratio of the two rubbers is generally 10–95:90–5, preferably 20–90:80–10, more preferably 30–80:70–20 in terms of the (iii):(iv) weight ratio.

As the rubber compounding agents, there can be used, for example, a reinforcing agent, a vulcanizing agent, a vulcanization accelerator, a vulcanization activator, an extender oil, etc.

As to the reinforcing agent, there is no particular restriction, and there can be used, for example, carbon black, silica, etc.

As the carbon black, there is no particular restriction, and there can be used, for example, furnace black, acetylene black, thermal black, channel black, graphite, etc. Of these, furnace black is particularly preferred. Specific examples thereof includes various grades such as SAF, ISAF, ISAF-HS, ISAF-LS, IISAF-HS, HAF, HAF-HS, HAF-LS, FEE and the like. These carbon blacks can be used singly or in combination of two or more of them.

The specific surface area ($N_2SA$) of the carbon black, measured by nitrogen adsorption is not particularly restricted. However, when the specific surface area is generally 5–200 $m^2/g$, preferably 50–150 $m^2/g$, more preferably 80–130 $m^2/g$, the rubber composition is highly improved in tensile strength and abrasion resistance. The DBP adsorption of carbon black is not particularly restricted, either. However, when the DBP adsorption is generally 5–300 ml/100 g, preferably 50–200 ml/100 g, more preferably 80–160 ml/100 g, the rubber composition is highly improved in tensile strength and abrasion resistance.

The abrasion resistance of the rubber composition is further improved when the carbon black used therein is a high-structure carbon black as disclosed in JP-A-5-230290, whose specific surface area measured by cetyltriammonium bromide (CTAB) adsorption is 110–170 $cm^2/g$ and whose DBP adsorption after four times repeated compression at a pressure of 24,000 psi (24M DBP adsorption) is 110–130 ml/100 g.

As to the silica, there is no particular restriction and there can be mentioned, for example, dry method white carbon, wet method white carbon, colloidal silica, precipitated silica disclosed in JP-A-62-62838, etc. Of these, particularly preferred is wet method white carbon composed mainly of hydrated silica. These silicas can be used singly or in combination of two or more of them.

There is no particular restriction as to the specific surface area of the silica. However, the rubber composition is well reinforced and sufficiently improved in abrasion resistance, resiliency, etc. when the silica has a specific surface area measured by nitrogen adsorption according to the BET method, of generally 50–400 $m^2/g$, preferably 100–250 $m^2/g$, more preferably 120–190 $m^2/g$. Herein, the specific surface area measured by nitrogen adsorption is a value measured according to the BET method specified by ASTM D 3037-81.

These reinforcing agents can be used singly or in combination of two or more of them. The proportion of the reinforcing agent used is generally 10–200 parts by weight, preferably 20–150 parts by weight, more preferably 30–120 parts by weight per 100 parts by weight of the rubber component.

There is no particular restriction as to the vulcanizing agent. There can be mentioned, for example, various sulfurs such as powder sulfur, precipitated sulfur, colloidal sulfur, insoluble sulfur, highly dispersible sulfur and the like; sulfur halides such as sulfur monochloride, sulfur dichloride and the like; organic peroxides such as dicumyl peroxide, di-t-butyl peroxide and the like; quinone dioximes such as p-quinone dioxime, p,p'-dibenzoylquinone dioxime and the like; organic polyamine compounds such as triethylenetetramine, hexamethylenediamine carbamate, 4,4'-methylene-bis(o-chloroaniline) and the like; methylol group-containing alkylphenols; and so forth. Of these, preferred are sulfurs and particularly preferred is powder sulfur. These vulcanizing agents can be used singly or in combination of two or more of them.

The proportion of the vulcanizing agent used is generally 0.1–15 parts by weight, preferably 0.3–10 parts by weight, more preferably 0.5–5 parts by weight per 100 parts by weight of the rubber component. Use of the vulcanizing agent in such an amount is particularly preferable because the resulting rubber composition can have superior properties in tensile strength, abrasion resistance, heat resistance, residual strain, etc.

The vulcanization accelerator includes, for example, sulfenamide type vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazole-sulfenamide, N,N'-diisopropyl-2-benzothiazolesulfenamide and the like; guanidine type vulcanization accelerators such as diphenylguanidine, diorthotolylguanidine, orthotolylbiguanidine and the like; thiourea type vulcanization accelerators such as thiocarboanilide, diorthotolylthiourea, ethylenethiourea, diethylthiourea, trimethylthiourea and the like; thiazole type vulcanization accelerators such as 2-mercaptobenzothiazole, dibenzothiazyl disulfide, zinc salt of 2-mercaptobenzothiazole, sodium salt of 2-mercaptobenzothiazole, cyclohexylamine salt of 2-mercaptobenzothiazole, 2-(2,4-dinitrophenylthio) benzothiazole and the like; thiuram type vulcanization accelerators such as tetramethylthiuram monosulfide, tetramethylthiuram disulfide, tetraethylthiuram disulfide, tetrabutylthiuram disulfide, dipentamethylenethiuram tetrasulfide and the like; dithiocarbamate type vulcanization accelerators such as sodium dimethyidithiocarbamate, sodium diethyldithiocarbamate, sodium di-n-butyidithiocarbamate, lead dimethyidithiocarbamate, zinc dimethyidithiocarbamate, zinc diethyidithiocarbamate, zinc di-n-butyidithiocarbamate, zinc pentamethylenedithiocarbamate, zinc ethylphenyidithiocarbamate, tellurium diethyldithiocarbamate, selenium dimethyidithiocarbamate, selenium diethyldithiocarbamate, copper dimethyldithiocarbamate, iron dimethyidithiocarbamate, diethylamine diethyldithiocarbamate, piperidine pentamethylenedithiocarbamate, pipecoline methylpentamethylenedithiocarbamate and the like; xanthogenate type vulcanization accelerators such as sodium isopropylxanthogenate, zinc isopropylxanthogenate, zinc butylxanthogenate and the like; and so forth.

These vulcanization accelerators can be used singly or in combination of two or more of them. The proportion of the vulcanization accelerator is generally 0.1–15 parts by weight, preferably 0.3–10 parts by weight, more preferably 0.5–5 parts by weight per 100 parts by weight of the rubber component.

There is no particular restriction as to the vulcanization activator. There can be used, for example, stearic acid, zinc oxide, etc. A preferable example of zinc oxide is one having a high surface activity and a particle size of 5 μm or less. Specific examples of such zinc oxide are active zinc oxide of 0.05–0.2 μm, zinc oxide of 0.3–1 μm, etc. Zinc oxide may be subjected, before use, to a surface treatment with an amine type dispersing agent or a wetting agent.

These vulcanization activators can be used singly or in combination of two or more of them. The proportion of the vulcanization activator is not particularly restricted and can be appropriately determined depending upon the application purpose of the rubber composition. Stearic acid is used in an amount of generally 0.05–15 parts by weight, preferably 0.1–10 parts by weight, more preferably 0.5–5 parts by weight per 100 parts by weight of the rubber component. Zinc oxide is used in an amount of generally 0.05–15 parts by weight, preferably 0.1–10 parts by weight, more preferably 0.5–5 parts by weight per 100 parts by weight of the rubber component.

The extender oil is selected from those of paraffinic type, naphthenic type, aromatic type, silicone type, etc. so as to meet the intended application of the rubber composition. The amount of the extender oil used is generally 1–150 parts by weight, preferably 2–100 parts by weight, more preferably 3–60 parts by weight per 100 parts by weight of the rubber component. When the amount of the extender oil is within the above range, the reinforcing agent is well dispersed in the rubber composition, and the rubber composition is highly balanced in tensile strength, abrasion resistance, heat resistance, etc.

The rubber composition of the present invention can comprise, besides the above-mentioned components, necessary amounts of other compounding agents according to ordinary methods. Other compounding agents include a filler (e.g. calcium carbonate or talc), an antioxidant of amine type or phenol type, an antiozonant, a silane coupling agent, an active agent (e.g. diethylene glycol), a processing aid, an adhesivity-imparting agent, a wax, etc.

The rubber composition of the present invention can be produced by mixing the above-mentioned components using a known kneader for rubber (e.g. a roll, a Banbury mixer).

BEST MODE FOR CARRYING OUT THE INVENTION

The present invention is hereinafter described more specifically by way of Production Examples, Examples and Comparative Examples. In these Examples, parts and % are by weight unless otherwise specified. Measurements of various properties were made according to the following methods.

(1) Bound styrene content and vinyl content of bound butadiene units, in polymer were measured by NMR.

(2) Weight-average molecular weight (M) of polymer was determined by measurement by GPC and subsequent calculation of a standard polystyrene-reduced value.

(3) Styrene chain distribution in copolymer was determined by decomposition of copolymer with ozone, measurement by GPC, and calculation of the proportions of isolated chains (S1) each consisting of one styrene unit and long chains (S8) each consisting of eight or more styrene units, according to the method described in "Preprint Vol. 29, No. 9, p. 2055" of The Society of Polymer Science, Japan.

(4) Abrasion resistance was measured using a Pico abrasion tester by ASTM D 2228. Expressed as an index (an abrasion resistance index) using the value of Comparative Example as 100.

(5) Resiliency was measured at 60° C. using a Lüpke pendulum by JIS K 6301. Expressed as an index using the value of Comparative Example as 100.

(6) Hardness of vulcanized rubber was measured using a Type A durometer by JIS K 6253. Expressed as an index using the value of Comparative Example as 100.

(7) Processability was rated based on the windability round a roll, according to the following standard.

◎: Winds tightly round a roll.

○: Winds nearly tightly round a roll although coming up from the roll occurs from time to time.

Δ: Winds round a roll but coming up from the roll occurs frequently.

X: Winding occurs rarely.

PRODUCTION EXAMPLE 1

(Production of modified diene rubber)

205 g of styrene, 480 g of 1,3-butadiene, 8,500 g of cyclohexane and 8 mM of tetramethylethylenediamine were fed into a stainless steel autoclave (a reactor) having an internal volume of 15 liters, which had been washed, dried and purged with nitrogen. Then, 6.5 mM of n-butyllithium was added as a n-hexane solution. With the reactor contents being stirred, polymerization was started at 40° C. 10 minutes from the start of the polymerization, 315 g of butadiene was added gradually in 80 minutes. The temperature inside the reactor increased to 60° C. After the completion of the polymerization, 8 mM of N-methyl-ε-caprolactam as modifier was added, and a reaction was conducted for 30 minutes. Thereafter, 2 ml of methanol was added to stop the reaction. Part of the resulting polymer (terminal-modified polymer D) was recovered by steam stripping and measured for bound styrene (ST) content, vinyl (V) content of butadiene units, and weight-average molecular weight ($M_1$). The results are shown in Table 1. The styrene chain distribution of the terminal-modified polymer D was such that the content of isolated chain (S1) consisting of one styrene unit was 90% by weight based on the total bound styrene amount and the content of long chain (S8) consisting of eight or more styrene units was 0.2% by weight on the same basis.

PRODUCTION EXAMPLE 2

(Production of high-molecular polymer)

Polymerization was conducted in the same manner as in Production Example 1 except that tetramethylethylenediamine was used in an amount of 9.0 mM and n-butyllithium was used in an amount of 4.5 mM. After the completion of the polymerization, 0.68 mM of tin tetrachloride (a coupling agent) was added, and a reaction was conducted for 60 minutes. Then, 2.0 mM of 4,4'-bis(diethylamino) benzophenone (a modifier) was added, and a reaction was conducted for 30 minutes. Thereafter, 2 ml of methanol was added to stop the reaction. In the same manner as in Production Example 1, part of the resulting high-molecular polymer SBR (high-molecular polymer H) was recovered and measured for ST, V and weight-average molecular weight ($M_2$). The results are shown in Table 1. The styrene chain distribution of the high-molecular polymer H was such that the content of isolated chain (S1) consisting of one styrene unit was 87% by weight based on the total bound styrene amount and the content of long chain (S8) consisting of eight or more styrene units was 0.1% by weight on the same basis.

PRODUCTION EXAMPLE 3

(Production of branched and modified polymer)

Polymerization was conducted in the same manner as in Production Example 1 except that there were used 168 g of styrene, 352 g of 1,3-butadiene, 6.5 mM of tetramethylethylenediamine, 5.5 mM of n-butyllithium and 280 g of butadiene (added later). After the completion of the polymerization, 0.5 mM of tin tetrachloride (a coupling agent) was added and a reaction was conducted for 60 minutes. Then, 4.0 mM of N-methyl-ε-caprolactam (a modifier) was added and a reaction was conducted for 30 minutes. After the completion of the reaction, 2 ml of methanol was added to stop the reaction. To the reaction mixture was added 10 g of 2,6-di-t-butyl-p-cresol, and the resulting modified polymer was solidified and recovered by steam stripping. The recovered polymer was subjected to water squeezing by the use of a roll and dried under vacuum at 60° C. for 24 hours to obtain a branched and modified polymer K. The polymer was measured for ST, V, $M_1$ and $M_2$. The results are shown in Table 1.

EXAMPLE 1

Into a 50-liter stainless steel container were fed the terminal-modified polymer D-containing solution obtained in Production Example 1 and the high-molecular polymer H-containing solution obtained in Production Example 2, in the proportions shown in Table 1. Then, the mixture was stirred at 60° C. for 30 minutes until the mixture became uniform. Thereto was added 10 g of 2,6-di-t-butyl-p-cresol, after which steam stripping was conducted for coagulation and recovery of a modified polymer. The recovered polymer was subjected to water squeezing by the use of a roll, followed by drying under vacuum at 60° C. for 24 hours, to obtain a diene rubber.

Diene rubbers were obtained in the same manner as in the above, using a solution of a terminal-modified polymer A, B, C, E, F or G shown in Table 1, produced in the same manner as in Production Example 1 and a solution of a high-molecular polymer I or J shown in Table 1, produced in the same manner as in Production Example 2.

In a 250-ml Banbury mixer were mixed one of the above diene rubbers or the branched and modified polymer K produced in Production Example 3, both as a material rubber, with compounding agents (other than sulfur and vulcanization accelerator) according to the following formulation. The resulting mixture was mixed with sulfur and a vulcanization accelerator according to the following formulation, using a roll, to prepare various rubber compositions. The rubber compositions were subjected to press vulcanization at 160° C. for 25 minutes, and test pieces were prepared from each vulcanizate for measurement of the properties.

| Formulation | (parts) |
| --- | --- |
| Material rubber | 100 |
| Stearic acid | 1.5 |
| Zinc oxide #1 | 3 |
| N-339 (1) | 50 |
| Aromatic oil | 5 |
| Sulfur | 1.75 |
| Vulcanization accelerator (2) | 1 |

(1) HAF-HS carbon black
(2) N-Cyclohexyl-2-benzothiazolesulfenamide

TABLE 1

|  | ST/V | $M_1$ | $M_2$ | Present invention | | | | | | Comparison | | | | | |
| --- | --- | --- | --- | --- | --- | --- | --- | --- | --- | --- | --- | --- | --- | --- | --- |
| Terminal-modified polymer A | 21/63 | 50000 | — | — | — | — | — | — | — | 20 | — | — | — | — | — |
| Terminal-modified polymer B | 21/66 | 150000 | — | 20 | — | — | — | — | — | — | — | — | — | — | — |
| Terminal-modified polymer C | 21/65 | 210000 | — | — | 20 | — | — | — | — | — | — | — | — | — | — |
| Terminal-modified polymer D | 21/65 | 250000 | — | — | — | 20 | — | — | — | — | — | — | — | — | — |
| Terminal-modified polymer E | 21/65 | 300000 | — | — | — | — | 20 | — | — | — | — | — | — | — | — |
| Terminal-modified polymer F | 21/65 | 360000 | — | — | — | — | — | 20 | — | — | — | — | — | — | — |

TABLE 1-continued

|  | ST/V | $M_1$ | $M_2$ | Present invention | | | | | | | Comparison | | | | |
| --- | --- | --- | --- | --- | --- | --- | --- | --- | --- | --- | --- | --- | --- | --- | --- |
| Terminal-modified polymer G | 21/64 | 650000 | — | — | — | — | — | — | — | — | 20 | — | — | — | — |
| High-molecular polymer H | 21/65 | — | 1200000 | 80 | 80 | 80 | 80 | — | 80 | — | 100 | — | — | — |
| High-molecular polymer I | 22/66 | — | 900000 | — | — | — | — | 80 | — | 80 | — | 100 | — | — |
| High-molecular polymer J | 21/64 | — | 600000 | — | — | — | — | — | — | — | — | — | 100 | — |
| Branched and modified polymer K | 21/64 | 210000 | 600000 | — | — | — | — | — | — | — | — | — | — | 100 |
| Molecular weight ratio ($M_2/M_1$) | | | | 8.0 | 5.7 | 4.8 | 3.3 | 3.0 | 24.0 | 1.4 | — | — | — | 2.9 |
| Abrasion resistance (index, larger is better) | | | | 102 | 115 | 116 | 109 | 105 | 96 | 109 | 100 | 95 | 92 | 85 |
| Resiliency (60° C.) (index, larger is better) | | | | 101 | 110 | 112 | 106 | 102 | 95 | 105 | 100 | 97 | 93 | 90 |
| JIS hardness (−10° C.) (index, smaller is better) | | | | 97 | 98 | 98 | 98 | 99 | 100 | 100 | 100 | 99 | 99 | 99 |
| Processability | | | | ⊙ | ⊙ | ⊙ | ⊙ | ○ | ⊙ | X | X | Δ | Δ | ○ |

As is clear from the results of Table 1, in the diene rubbers of the present invention, the abrasion resistance, resiliency and low-temperature hardness are improved significantly and the processability is improved sufficiently; and the abrasion resistance, resiliency, low-temperature hardness and processability are further improved by increasing the weight-average molecular weight ratio ($M_2/M_1$). In contrast, in the liquid rubber blend (containing the terminal-modified polymer A), while the processability is superior, the abrasion resistance and resiliency are inferior and the low-temperature hardness is not substantially improved; in the rubber blend containing a modified polymer of too large a molecular weight (the terminal-modified polymer G) and therefore having a small molecular weight ratio between high-molecular polymer and modified polymer, the processability is extremely low; and in the polymer wherein the high-molecular polymer portion has no sufficiently large molecular weight (the modified and high-molecular polymer K), the abrasion resistance and resiliency are low.

EXAMPLE 2

Diene rubbers were produced in the same manners as in Production Example 1 and Production Example 4 except that the modifier was changed from N-methyl-ε-caprolactam to N-methyl-2-pyrrolidone, 4,4'-bis(diethylamino) benzophenone or N-vinyl-2-piperidone, and the same tests were conducted. As a result, it was confirmed that the same results as in Example 1 could be obtained even when there was modifier change.

EXAMPLE 3

Diene rubbers were prepared in the same manner as in Example 1, using terminal-modified polymers L, N, P, Q, R and S and high-molecular polymers M, O and T shown in Tables 2, 3 and 4, all different in styrene content and 1,2-bond content and produced in the same manner as in Production Example 1 and Production Example 2. Then, rubber compositions were prepared in the same manner as in Example 1, and their vulcanizates were evaluated. The results are shown in Tables 2, 3 and 4. As is clear from the results of Tables 2, 3 and 4, the effects of the present invention are seen even when there were used terminal-modified polymers and high-molecular polymers having various microstructures whose Tg are different from each other.

TABLE 2

|  | ST/V | Tg (°C.) | $M_1$ | $M_2$ | Present invention | Comparison |
| --- | --- | --- | --- | --- | --- | --- |
| Terminal-modified polymer L | 15/28 | −60 | 220000 | — | 20 | — |
| High-molecular polymer M | 15/29 | −60 | — | 1200000 | 80 | 100 |
| Molecular weight ratio ($M_2/M_1$) | | | | | 5.5 | — |
| Abrasion resistance (index, larger is better) | | | | | 115 | 100 |
| Resiliency (60° C.) (index, larger is better) | | | | | 108 | 100 |
| JIS hardness (−10° C.) (index, smaller is better) | | | | | 98 | 100 |
| Processability | | | | | ⊙ | X |

TABLE 3

|  | ST/V | Tg (° C.) | $M_1$ | $M_2$ | Present invention | Comparison |
| --- | --- | --- | --- | --- | --- | --- |
| Terminal-modified polymer N | 23/24 | −50 | 230000 | — | 20 | — |
| High-molecular polymer O | 23/35 | −50 | — | 1100000 | 80 | 100 |
| Molecular weight ratio ($M_2/M_1$) | | | | | 4.8 | — |
| Abrasion resistance (index, larger is better) | | | | | 118 | 100 |
| Resiliency (60° C.) (index, larger is better) | | | | | 111 | 100 |
| JIS hardness (−10° C.) (index, smaller is better) | | | | | 98 | 100 |
| Processability | | | | | ⊙ | X |

TABLE 4

|  | ST/V | Tg (°C.) | M₁ | M₂ | Present invention | | | | Comparison |
|---|---|---|---|---|---|---|---|---|---|
| Terminal-modified polymer P | 45/52 | -12 | 200000 | — | 10 | — | — | — | — |
| Terminal-modified polymer Q | 22/65 | -25 | 210000 | — | — | 10 | — | — | — |
| Terminal-modified polymer R | 0/76 | -33 | 190000 | — | — | — | 10 | — | — |
| Terminal-modified polymer S | 22/10 | -80 | 200000 | — | — | — | — | 10 | — |
| High-molecular polymer T | 21/66 | -25 | — | 1150000 | 90 | 90 | 90 | 90 | 100 |
| Molecular weight ratio (M₂/M₁) | | | | | 5.8 | 5.5 | 6.1 | 5.8 | — |
| Abrasion resistance (index, larger is better) | | | | | 102 | 110 | 103 | 109 | 100 |
| Resiliency (60° C.) (index, larger is better) | | | | | 101 | 107 | 108 | 112 | 100 |
| JIS hardness (-10° C.) (index, smaller is better) | | | | | 100 | 98 | 97 | 95 | 100 |
| Processability | | | | | ⊚ | ⊚ | ⊚ | ⊚ | X |

EXAMPLE 4

In the same manner as in Example 1 were prepared diene rubbers comprising the terminal-modified polymer D and the high-molecular polymer H at different mixing ratios. Their vulcanizates were measured for properties in the same manner as in Example 1. The results are shown in Table 5.

TABLE 5

|  | ST/V | M₁ | M₂ | Comparison | Present invention | | | | Comparison |
|---|---|---|---|---|---|---|---|---|---|
| Terminal-modified polymer D | 21/65 | 250000 | — | — | 20 | 40 | 60 | 80 | 100 |
| High-molecular polymer H | 21/65 | — | 1200000 | 100 | 80 | 60 | 40 | 20 | — |
| Molecular weight ratio (M₂/M₁) | | | | — | 4.8 | 4.8 | 4.8 | 4.8 | — |
| Abrasion resistance (index, larger is better) | | | | 100 | 116 | 110 | 109 | 105 | 95 |
| Resiliency (60° C.) (index, larger is better) | | | | 100 | 112 | 107 | 105 | 102 | 92 |
| JIS hardness (-10° C.) (index, smaller is better) | | | | 100 | 98 | 98 | 97 | 97 | 97 |
| Processability | | | | X | ⊚ | ⊚ | ⊚ | ⊚ | ○ |

As is clear from the results of Table 5, the effects of the combined use of the modified polymer and the high-molecular polymer is synergistic. That is, processability is sufficiently improved by combined use, as compared with the individual uses of the terminal-modified polymer and the high-molecular polymer; and abrasion resistance, resiliency, etc. are higher than the individual uses. Sufficient improvement is seen in any mixing ratio tested and larger improvement is seen particularly in mixing ratios wherein the proportion of the terminal-modified polymer is 50% by weight or less.

EXAMPLE 5

Silica was used as a reinforcing agent, and the diene rubbers of Example 4 were used as a material rubber. In a 250-ml Brabender type mixer were mixed, at 120° C. for 2 minutes, the total amount of the material rubber, the half amount of silica and the half amount of a silane coupling agent according to the formulation of Table 6. Then, the remaining compounding agents other than sulfur and vulcanization accelerator were added, followed by kneading for 3 minutes.

Thereafter, the resulting mixture, sulfur and a vulcanization accelerator were placed in an open roll of 50° C. and kneaded. The resulting material was subjected to press vulcanization at 160° C. for 30 minutes, and test pieces were prepared from each vulcanizate and measured for properties. The results are shown in Table 6.

| | (parts) | | |
|---|---|---|---|
| Formulation | 1st time | 2nd time | 3rd time |
| Material rubber | 100 | — | — |
| Silica | 25 | 25 | — |
| Carbon black (1) | — | 30 | — |
| Silane coupling agent (2) | 1.5 | 1.5 | — |
| Aromatic oil | — | 30 | — |
| Diethylene glycol | — | 2 | — |
| Zinc oxide | — | 1.5 | — |
| Stearic acid | — | 2 | — |
| Sulfur | — | — | 1.5 |
| Vulcanization accelerator (3) | — | — | 2.5 |

(1) HAF-HS carbon black
(2) Si69 (a product of Degussa)
(3) N-Cyclohexyl-2-benzothiazolesulfenamide

TABLE 6

|  | ST/V | M₁ | M₂ | Present invention | | Comparison |
|---|---|---|---|---|---|---|
| Terminal-modified polymer D | 21/65 | 250000 | — | 20 | 20 | — |
| High-molecular polymer H | 21/65 | — | 1200000 | 80 | 80 | 100 |
| Molecular weight ratio (M₂/M₁) | | | | 4.8 | 4.8 | — |
| Kind of silica | | | | (1) | (2) | (2) |
| Abrasion resistance (index, larger is better) | | | | 135 | 112 | 100 |

TABLE 6-continued

|  | ST/V | $M_1$ | $M_2$ | Present invention | Comparison |
|---|---|---|---|---|---|
| Resiliency (60° C.) (index, larger is better) |  |  |  | 132   118 | 100 |
| JIS hardness (−10° C.) (index, smaller is better) |  |  |  | 95    99 | 100 |
| Processability |  |  |  | ⊚     ○ | X |

(1) Z1165 MP (a product of Rhone-Poulenc, specific surface area measured by nitrogen adsorption = 175 m²/g)
(2) Nipsil AQ (a product of Nippon Silica Industrial Co., Ltd., specific surface area measured by nitrogen adsorption = 200 m²/g)

EXAMPLE 6

Rubber compositions were prepared in the same manner as in Example 1, using, as a material rubber, a combination of the diene rubber of Example 4 (a mixture of the terminal-modified polymer D and the high-molecular polymer H) or the branched and modified polymer K with natural rubber, a styrene-butadiene rubber produced by emulsion polymerization and/or a high-cis polybutadiene. Vulcanizates were produced from the rubber compositions and evaluated. The results are shown in Tables 7, 8 and 9.

TABLE 7

|  | ST/V | $M_1$ | $M_2$ | Examples | Comparative Example |
|---|---|---|---|---|---|
| Terminal-modified polymer D | 21/65 | 250000 | — | 16    12 | — |
| High-molecular polymer H | 21/65 | — | 1200000 | 64    48 | — |
| Branched and modified polymer K | 21/64 | 210000 | 600000 | —     — | 60 |
| Natural rubber |  |  |  | 20    40 | 40 |
| Molecular weight ratio ($M_2/M_1$) |  |  |  | 4.8   4.8 | 2.9 |
| Abrasion resistance (index, larger is better) |  |  |  | 110   107 | 100 |
| Resiliency (60° C.) (index, larger is better) |  |  |  | 108   105 | 100 |
| JIS hardness (−10° C.) (index, smaller is better) |  |  |  | 99    99 | 100 |
| Processabilty |  |  |  | ⊚     ⊚ | ⊚ |

TABLE 8

|  | ST/V | $M_1$ | $M_2$ | Examples | Comparative Example |
|---|---|---|---|---|---|
| Terminal-modified polymer D | 21/65 | 250000 | — | 10 | — |
| High-molecular polymer H | 21/65 | — | 1200000 | 40 | — |
| Branched and modified polymer K | 21/64 | 210000 | 600000 | — | 50 |
| Styrene-butadiene rubber (ST = 23.5) produced by emulsion polymerization |  |  |  | 50 | 50 |
| Molecular weight ratio ($M_2/M_1$) |  |  |  | 4.8 | 2.9 |
| Abrasion resistance (index, larger is better) |  |  |  | 108 | 100 |
| Resiliency (60° C.) (index, larger is better) |  |  |  | 105 | 100 |
| JIS hardness (−10° C.) (index, smaller is better) |  |  |  | 99 | 100 |
| Processability |  |  |  | ⊚ | ⊚ |

TABLE 9

|  | ST/V | $M_1$ | $M_2$ | Examples | Comparative Example |
|---|---|---|---|---|---|
| Terminal-modified polymer D | 21/65 | 250000 | — | 9 | — |
| High-molecular polymer H | 21/65 | — | 1200000 | 36 | — |
| Branched and modified polymer K | 21/64 | 210000 | 600000 | — | 45 |
| Natural rubber |  |  |  | 30 | 30 |
| Styrene-butadiene rubber (ST = 23.5) produced by emulsion polymerization |  |  |  | 20 | 20 |
| High-cis polybutadiene rubber |  |  |  | 5 | 5 |
| Molecular weight ratio ($M_2/M_1$) |  |  |  | 4.8 | 2.9 |
| Abrasion resistance (index, larger is better) |  |  |  | 107 | 100 |
| Resiliency (60° C.) (index, larger is better) |  |  |  | 104 | 100 |
| JIS hardness (−10° C.) (index, smaller is better) |  |  |  | 99 | 100 |
| Processability |  |  |  | ⊚ | ⊚ |

EXAMPLE 7

A diene rubber (a mixture of a terminal-modified polymer N and a high-molecular polymer U, which was produced in the same manner as in Production Example 2 except that silicon tetrachloride was used as a coupling agent) was produced in the same manners as in Production Examples 1 and 2 and Example 1. A vulcanizate produced from the diene rubber was evaluated in the same manner as in Example 1. The results are shown in Table 10.

TABLE 10

|  | ST/V | Tg (° C.) | $M_1$ | $M_2$ | Present invention | Comparison |
| --- | --- | --- | --- | --- | --- | --- |
| Terminal-modified polymer N | 23/34 | −50 | 230000 | — | 20 | — |
| High-molecular polymer U | 23/35 | −50 | — | 1150000 | 80 | 100 |
| Molecular weight ratio ($M_2/M_1$) |  |  |  |  | 5.0 | — |
| Abrasion resistance (index, larger is better) |  |  |  |  | 123 | 100 |
| Resiliency (60° C.) (index, larger is better) |  |  |  |  | 114 | 100 |
| JIS hardness (−10° C.) (index, smaller is better) |  |  |  |  | 98 | 100 |
| Processability |  |  |  |  | ⊚ | X |

The embodiments of the present invention are shown below.

(1) A diene rubber (iii) comprising:
  a modified diene rubber (i) having a weight-average molecular weight of 150,000–500,000, obtained by reacting a diene polymer having a bound active metal in the molecule, with a modifier having a functional group represented by the general formula —C(=M)— (wherein M is an oxygen atom or a sulfur atom), and
  a high-molecular diene rubber (ii) having a weight-average molecular weight of 800,000 or more.

(2) A diene rubber (iii) according to (1), wherein the proportions of the modified diene rubber (i) and the high-molecular diene rubber (ii) are 5–80% by weight vs. 95–20% by weight.

(3) A diene rubber (iii) according to (1) or (2), wherein the modified diene rubber (i) is a rubber composed mainly of a conjugated diene.

(4) A diene rubber (iii) according to (3), wherein the rubber composed mainly of a conjugated diene is a conjugated diene homopolymer or a conjugated diene aromatic vinyl copolymer.

(5) A diene rubber (iii) according to (3) or (4), wherein the content of the conjugated diene is at least 40% by weight.

(6) A diene rubber (iii) according to any of (1) to (5), wherein the active metal is a metal capable of giving rise to anionic polymerization.

(7) A diene rubber (iii) according to (6), wherein the metal capable of giving rise to anionic polymerization is at least one metal selected from the group consisting of alkali metals, alkaline earth metals and lanthanide series rare earth metals.

(8) A diene rubber (iii) according to (6) or (7), wherein the active metal is bonded to the terminals of the polymer chain.

(9) A diene rubber (iii) according to (8), wherein the active metal terminals are obtained by anionic polymerization.

(10) A diene rubber (iii) according to any of (1) to (9), wherein the modifier further has a substituted amino group.

(11) A diene rubber (iii) according to (10), wherein the modifier has a functional group represented by -C(=M)—N< (M is an oxygen atom or a sulfur atom).

(12) A diene rubber (iii) according to any of (1) to (11), wherein the high-molecular diene rubber (ii) is a copolymer of a conjugated diene and an aromatic vinyl.

(13) A diene rubber (iii) according to (12), wherein the proportions of the conjugated diene and the aromatic vinyl are 40–95% by weight vs. 60–5% by weight.

(14) A diene rubber (iii) according to any of (1) to (13), wherein the high-molecular diene rubber (ii) is a branched polymer.

(15) A diene rubber (iii) according to (14), wherein the branched polymer is a polymer subjected to coupling with a polyfunctional coupling agent by at least 10% by weight.

(16) A diene rubber (iii) according to (15), wherein the polyfunctional coupling agent is a compound represented by the general formula $R_pMX_{4-p}$, $M'X_2$, $X_3M-R'-MX_3$ or $X_2RM-R'-MRX_2$ (wherein M is Si, Ge, Sn or Pb; M' is Sn or Pb; X is chlorine, bromine or iodine; R is an alkyl group, an alkoxy group, an allyl group or an aryl group; R' is an alkylene group or a phenylene group; and p is an integer of 0–4).

(17) A diene rubber (iii) according to (15) or (16), wherein the polyfunctional coupling agent is a tin compound or a silicon compound.

(18) A diene rubber (iii) according to any of (1) to (17), wherein the ratio of the weight-average molecular weight ($M_1$) of the modified diene rubber and the weight-average molecular weight ($M_2$) of the high-molecular diene rubber has a relation of $M_2/M_1 > 3.2$.

(19) A diene rubber (iii) according to any of (1) to (18), wherein the content of the bound conjugated diene in the diene rubber (iii) is 100–40% by weight and the content of the bound aromatic vinyl in the diene rubber (iii) is 0–60% by weight.

(20) A diene rubber (iii) according to (19), wherein the content of the bound conjugated diene is 40–95% by weight and the content of the bound aromatic vinyl is 60–5% by weight.

(21) A diene rubber (iii) according to (20), wherein the content of the aromatic vinyl isolated chain (S1) consisting of one aromatic vinyl unit is 40% by weight or more of the total bound aromatic vinyl amount and the content of the aromatic vinyl long chain (S8) consisting of eight or more aromatic vinyl units is 5% by weight or less of the total bound aromatic vinyl amount.

(22) A diene rubber (iii) according to any of (19) to (21), wherein the content of the conjugated diene moiety is 10–90%.

(23) A diene rubber (iii) according to (1), having a Mooney viscosity of 20–150.

(24) A process for producing a diene rubber, which comprises mixing:
  a modified diene rubber (i) having a weight-average molecular weight of 150,000–500,000, obtained by subjecting a conjugated diene or a conjugated diene and an aromatic vinyl to anionic polymerization in a hydrocarbon solvent in the presence of an active metal-containing initiator and then reacting the resulting polymer with a modifier having a functional group represented by the general formula -C(=M)— (wherein M is an oxygen atom or a sulfur atom), and
  a high-molecular diene rubber (ii) having a weight-average molecular weight of 800,000 or more in a solution state and then subjecting the resulting mixture to solvent removal.

(25) A process according to (24), wherein the amount of the modifier used is 0.5 equivalent or more per the active metal.

(26) A process according to (25), wherein the high-molecular diene rubber is obtained by subjecting a conjugated diene or a conjugated diene and an aromatic vinyl to anionic polymerization using an active metal-containing initiator in a hydrocarbon solvent and then subjecting the resulting polymer to a coupling reaction with a polyfunctional coupling agent.

(27) A process according to (26), wherein the amount of the polyfunctional coupling agent used is 0.1 equivalent or more per the active metal.

(28) A rubber composition comprising, as the rubber component, a diene rubber according to any of (1) to (23) in an amount of at least 10% by weight.

(29) A rubber composition according to (28), further comprising a reinforcing agent.

(30) A rubber composition according to (29), comprising the reinforcing agent in an amount of 10–200 parts by weight per 100 parts by weight of the rubber component.

(31) A rubber composition according to (29) or (30), wherein the reinforcing agent is carbon black and/or silica.

(32) A rubber composition according to any of (28) to (31), further comprising a vulcanizing agent, a vulcanization accelerator and a vulcanization activator.

(33) A rubber composition according to (32), further comprising an extender oil.

EFFECTS OF THE INVENTION

The diene rubber and the rubber composition comprising the diene rubber, both according to the present invention are superior in abrasion resistance, resiliency, processability, low-temperature properties, etc. Therefore, they can be used in various applications where such properties are utilized; for example, tire portions such as tread, carcass, side wall, bead and the like, rubber products such as hose, window frame, belt, rubber vibration insulator, automobile parts and the like, and reinforcing rubbers for resins such as impact-resistant polystyrene, ABS resin and the like. The diene rubber and the rubber composition both of the present invention are very suitable for use particularly in the tire tread of low fuel consumption tire because of the above-mentioned properties, but can also be used in the tread, side wall, under tread, carcass, bead, etc. of all-season tire, high-performance tire, studless tire, etc. Being also superior in low-temperature hardness, they can be suitable also for use in winter.

We claim:

1. A diene rubber (iii) comprising:

(i) a modified diene rubber, having a weight-average molecular weight of 150,000–500,0000, obtained by reacting a diene polymer having a bound active metal, which is an alkali metal, in the molecule with a modifier having a functional group represented by the general formula —C(=M)—, wherein M is an oxygen atom or a sulfur atom, and (ii) a branched high-molecular diene rubber having a weight-average molecular weight of 800,000 or more, obtained by producing an active polymer in the same manner as in the abovementioned production of the modified diene rubber (i) and then reacting the active polymer with a polyfunctional coupling agent in an amount of at least 10% by weight, wherein the proportion of the modified diene rubber (i) is 5–80% by weight and the proportion of the high-molecular diene rubber (ii) is 95–20% by weight, and wherein the vinyl bound contest of the conjugated diene units in the diene rubber (iii) is 10–90%.

2. The diene rubber according the claim 1, wherein the modified diene rubber (i) is a rubber composed mainly of a conjugated diene.

3. The diene rubber according to claim 2, wherein the rubber composed mainly of a conjugated diene is a conjugated diene homopolymer or a conjugated diene-vinyl aromatic copolymer.

4. The diene rubber according to claim 2, wherein the content of the conjugated diene is at least 40% by weight.

5. The diene rubber according to claim 1, wherein the active metal is a metal capable of giving rise to anionic polymerization.

6. The diene rubber according to claim 1, wherein the active metal is bonded to the terminals of the polymer chain.

7. The diene rubber according to claim 6, wherein the active metal bonded to the terminals of the polymer chain is obtained by anionic polymerization.

8. The diene rubber according to claim 1, wherein the modifier further comprises a substituted amino group.

9. The diene rubber according to claim 8, wherein the modifier has a functional group represented by —C(=M)—N<, wherein M is an oxygen atom or a sulfur atom.

10. The diene rubber according to claim 1, wherein the high-molecular diene rubber (ii) is a copolymer of a conjugated diene and a vinyl aromatic monomer.

11. The diene rubber according to claim 10, wherein the proportion of the conjugated diene in the high-molecular diene rubber (ii) is 40–95% by weight and the proportion of the vinyl aromatic monomer in the high-molecular diene rubber (ii) is 60–5% by weight.

12. The diene rubber according to claim 1, wherein the polyfunctional coupling agent is a compound represented by the general formula $R_pMX_{4-p}$, $M'X_2$, $X_3M—R'—MX_3$, or $X_2RM—R'—MRX_2$ wherein M is Si, Ge, Sn or Pb; M' is Sn or Pb; X is chlorine, bromine or iodine, R is an alkyl group, an alkoxy group, an allyl group or an aryl group; R' is an alkylene group or a phenylene group, and p is an integer of 0 to 4.

13. The diene rubber according to claim 1, wherein the polyfunctional coupling agent is a tin compound or a silicon compound.

* * * * *